Nov. 1, 1938. O. CARLSON 2,135,169

COLLAR HOLDER

Filed Feb. 14, 1935

Inventor
Oscar Carlson
Nathaniel Frucht
By his Attorney

Patented Nov. 1, 1938

2,135,169

UNITED STATES PATENT OFFICE 2,135,169

COLLAR HOLDER

Oscar Carlson, East Providence, R. I., assignor to Dolan & Bullock, Providence, R. I., a partnership consisting of Arthur S. Dolan, Frederick A. Bullock, and William G. Bennett Application February 14, 1935, Serial No. 6,530

2 Claims. (Cl. 24—81)

My present invention relates to the jewelry art, and has particular reference to collar holder constructions.

The collar holders heretofore manufactured have included two spaced pairs of ends, the ends of each pair being spring pressed towards each other; the ends have either been of flat stock or one end has been of loop construction with the cooperating end resiliently pressed to extend into the loop.

These constructions have certain disadvantageous features. The flat stock ends have a small contact area for the ends, whereby a collar edge gripped therebetween is subjected to concentrated pressure which has a tendency to indent the collar fabric; the loop type has a tendency, due to the resiliently urged spring end, to force the fabric of a collar edge gripped therein, into the loop, thus producing a raised section.

It is the principal object of my invention to provide a collar holder which firmly grips the collar edges, but which spreads the gripping surface so as to decrease the intensity of the pressure, and has no tendency to produce indentations or raised portions in the collar fabric.

With the above and other objects and advantageous features in view, my invention consists of a novel arrangement of parts more fully disclosed in the detailed description following, in conjunction with the accompanying drawing, and more specifically defined in the claims appended thereto.

It has been found desirable to provide a collar holder which has a wide surface engaging the edge of a collar, and has a firm resilient grip which is distributed over the engaging area so as to decrease the intensity of pressure, and thus prevent damage or distortion of the collar fabric. To this end, I utilize a construction having upper and lower members, the members having their ends formed as loops which are resiliently urged towards each other.

Figure 1:
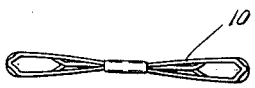
Fig. 1 is a top plan view of the novel collar holder construction.
Figure 2:
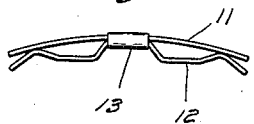
Fig. 2 is a side elevation thereof.
Figure 3:
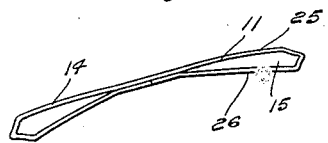
Fig. 3 is an enlarged perspective of the upper member.
Figure 4:
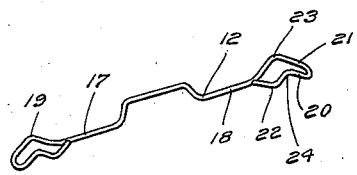
Fig. 4 is an enlarged perspective of the lower member.
Figure 5:
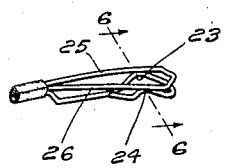
Fig. 5 is an enlarged detail perspective of the assembly.
Figure 6:
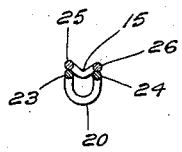
Fig. 6 is a section on the line 6—6 of Fig. 5.

Referring to the drawing, the novel collar holder 10 includes an upper member 11 and a lower member 12, secured together at their central portions by a connector base 13. The upper member is preferably made of a single length of spring wire, see Fig. 3, bent to form end jaw loops 14, 15, the ends of the wire joining at the center as illustrated to be locked by the connector band. The lower member is also preferably made of a single length of spring wire, see Fig. 4, bent to provide a center section 16, two offset sections 17, 18, and two end jaw sections 19, 20, the latter having upwardly turned sides 21, 22 sharply bent to form arcuate contact sections or humps 23, 24 which resiliently engage with the lower surfaces 25, 26 of the sides of the jaw loops 14, 15, due to the formation of the lower member.

Although I have described the upper and lower members as made of wire, it is obvious that they may be made of flat stock, stamped or punched; moreover, the connector band 13 may be formed of any material, and may secure the two members together in different manner. If desired, the members may be shaped to each provide two jaws resiliently urged towards each other, like the jaws 15 and 20, the two members being connected together in any suitable manner as by a link or other connector; and the upper jaw may be of any metal and shape, and may, if desired, have a metal cover top formed of sheet metal or the like.

It is thus evident that the novel construction includes spaced sets of jaws, each jaw having two sides, with the sides of the lower jaws resiliently urged towards the sides of the upper jaws, whereby the collar edge is engaged between the jaws, which are wide and thus provide a distributed grip with low intensity of pressure, whereby the collar edge is firmly held without marking, indentation, or raising of the fabric.

While I have described a specific constructional embodiment of my invention, it is obvious that desired changes in the material used for the parts, and in the size and relative arrangement of the parts, may be made to suit the requirements for different designs, within the spirit and the scope of the invention as defined in the appended claims.

I claim:

1. In a collar holder construction, an upper member, a lower member, said members being of substantially the same length, and a connector locking said members together at their center portions, the ends of each member comprising loop portions, the contiguous loop portions of said members being in substantially parallel planes and of similar width, and said lower member ends being resiliently urged towards said upper member ends, whereby the sides of the lower loop portions are resiliently urged to contact the sides of the contiguous upper loop portions.

2. In a collar holder construction, an upper member, a lower member, said members being of substantially the same length, and a connector locking said members together at their center portions, the ends of each member comprising loop portions, the contiguous loop portions of said members being in substantially parallel planes and of similar width, the sides of the lower loop portions extending towards the sides of the upper loop portions intermediate their ends, and said lower member ends being resiliently urged towards said upper member ends, whereby the sides of the lower loop portions are resiliently urged to contact the sides of the contiguous upper loop portions.

OSCAR CARLSON.